United States Patent [19]

Peterson

[11] 4,138,929
[45] Feb. 13, 1979

[54] PRESSURE RESPONSIVE CHECK VALVE

[75] Inventor: Wayne A. Peterson, Washington, Ill.

[73] Assignee: Caterpillar Tractor Co., Peoria, Ill.

[21] Appl. No.: 842,700

[22] Filed: Oct. 17, 1977

[51] Int. Cl.² .................................................. F15B 13/042
[52] U.S. Cl. ...................................... 91/446; 137/489;
137/492.5; 137/493; 91/451
[58] Field of Search ............... 137/493, 596, 489, 492, 137/492.5; 91/446, 451

[56] References Cited

U.S. PATENT DOCUMENTS

| | | | |
|---|---|---|---|
| 3,124,343 | 3/1964 | Williamson | 137/493 X |
| 3,362,430 | 1/1968 | Olen | 137/493 X |
| 4,013,093 | 3/1977 | Pensa | 137/493 X |

*Primary Examiner*—Alan Cohan
*Attorney, Agent, or Firm*—John W. Grant

[57] ABSTRACT

A pressure responsive check valve permits fluid flow therethrough in a first direction and blocks fluid flow therethrough in the reverse direction until the fluid pressure at the blocked side exceeds a preselected pressure level at which time the check valve is controllably opened for reverse flow therethrough.

4 Claims, 2 Drawing Figures

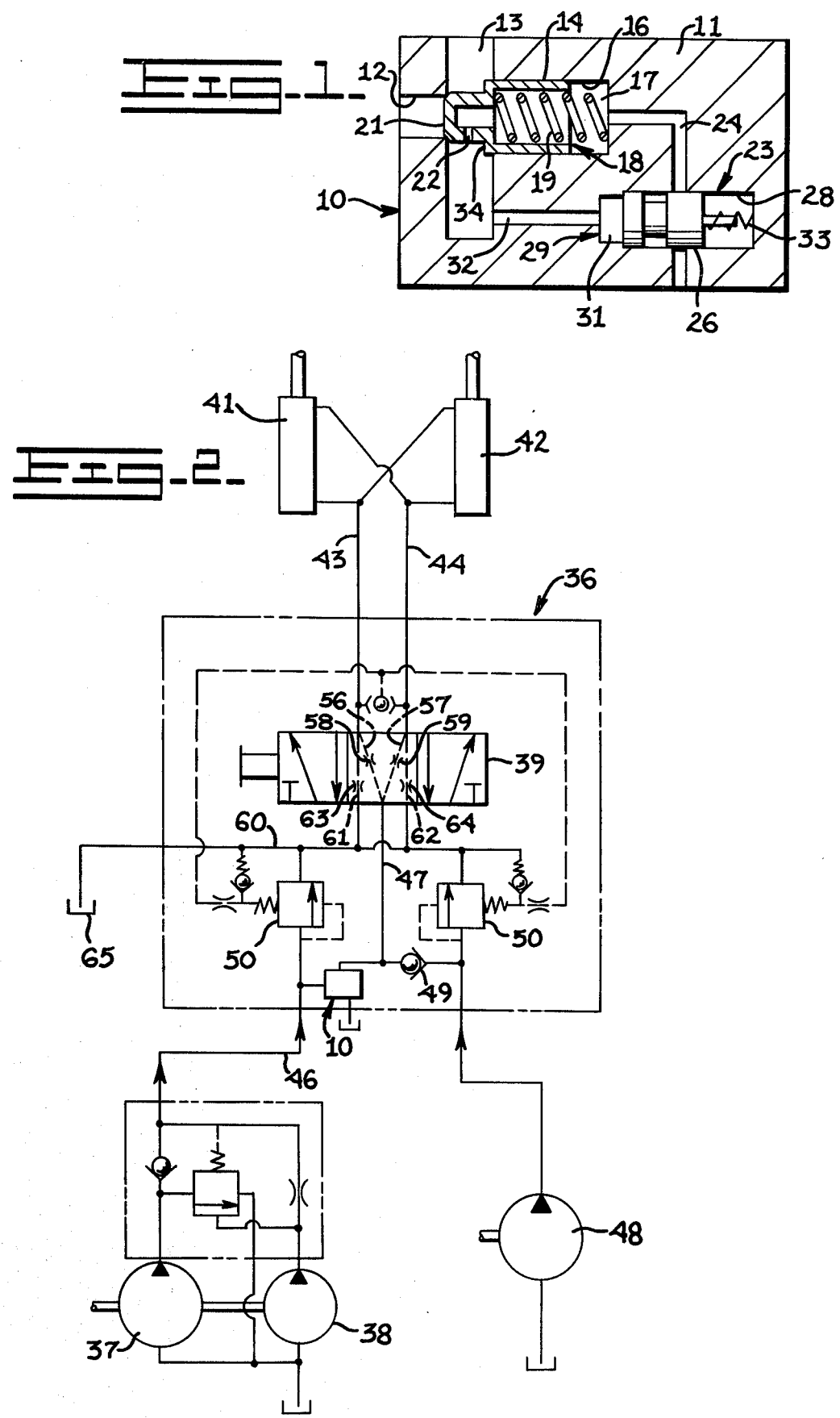

PRESSURE RESPONSIVE CHECK VALVE

BACKGROUND OF THE INVENTION

This invention relates to a check valve and more particularly to a pressure responsive check valve which is opened for controlled reverse fluid flow therethrough when the fluid pressure at the blocked side exceeds a preselected pressure level.

Various embodiments of dual source fluid supply systems for hydraulic circuits have been utilized which have two sources or pumps delivering fluid under pressure to a steering circuit. In one embodiment of these systems, the respective pumps are operatively associated with main relief valves which relieve excessive fluid pressure developed by the pumps. Also operatively associated with the pumps are a pair of check valves which prevent cross flow between the pumps in the event that one of the pumps should become nonoperative. Although the control valve of FIG. 2 is a closed center valve, there is limited or restricted fluid flow through orifices in the valve when the valve is in the position shown. Such orifices are disclosed in FIG. 2 of the drawings of the present application.

One of the problems encountered in such a system is that the check valves are positioned between the steering cylinders and the relief valves and block reverse flow from the steering cylinders to the pump and relief valve. Thus, upon a sharp pressure build-up in a steering cylinder due to, for example, a wheel of the vehicle striking an object, such pressure is not relieved to any great extent since the check valve prevents reverse flow from the steering cylinders to the relief valve. In extreme cases, the pressure buildup can cause damage to the pins and brackets which connect the steering cylinders to the vehicle.

SUMMARY OF THE INVENTION

The present invention is directed to overcoming one or more of the problems as set forth above.

According to the present invention, there is provided a pressure responsive check valve having an element which normally blocks reverse fluid flow through the check valve. A means moves the element to an opened position for controlled reverse fluid flow through the check valve in response to the fluid pressure in an outlet port exceeding a preselected pressure level.

BRIEF DESCRIPTION OF THE DRAWINGS

FIG. 1 is a diagrammatic sectional view of a pressure responsive check valve of this invention.

FIG. 2 is a schematic representation of a hydraulic system in which the invention is incorporated.

DETAILED DESCRIPTION

Referring now to FIG. 1, a pressure responsive check valve is generally represented by the reference numeral 10 and has a body 11. The body has an inlet port 12 and an outlet port 13. A valve element 14 is slidably positioned within a bore 16 in the body 11 forming a chamber 17 at a rear side 18 of the valve element. The valve element is movable between a first position at which the inlet port is blocked from communication with the outlet port and a second position at which the outlet port is in communication with the inlet port. A helical spring 19 is positioned within the chamber 17 and urges the valve element to the first position shown in the drawings. At the first position, a nose portion 21 of the valve element blocks the inlet port from the outlet port. An orifice 22 connects the chamber 17 with the outlet port 13.

The valve element 14 is moved to the second position in response to the fluid pressure in the inlet port 12 being greater than the fluid pressure in the outlet port 13 by a preselected pressure differential sufficient to overcome the force of the spring 19. The valve element is moved to the first position to block reverse flow from the outlet port to the inlet port when the pressure differential between the inlet port and outlet port drops below the preselected pressure differential and when the fluid pressure in the outlet port is greater than the fluid pressure in the inlet port.

A means 23 is provided for moving the valve element 14 to the second position in response to the fluid pressure in the outlet port 13 exceeding a preselected pressure level.

The means 23 can be the chamber 17, the orifice 22, a vent passage 24, and a valve spool 26. The vent passage is connected to the chamber 17. The valve spool 26 is slidably positioned within a bore 28 in the body 11 and is movable between a first position at which fluid flow through the vent passage is blocked and a second position at which chamber 17 is vented. A means 29 is provided for moving the valve spool 26 to the second position in response to the fluid pressure in the outlet port 13 exceeding the preselected pressure level.

The means 29 can be, for example, a chamber 31 at one end of the valve spool 26 and a passage 32 connecting chamber 31 to the outlet port 13. A helical spring 33 is positioned in the pathway of the valve spool for urging the valve spool to the first position. The spring is preferably preloaded to a force sufficient for holding the valve spool 26 in the first position until the fluid pressure in the chamber 31 exceeds the preselected pressure level.

Thus when the fluid pressure in outlet port 13 and hence chamber 31 exceeds the preselected pressure level, the valve spool 26 is moved to the second position venting chamber 31. With chamber 31 vented, the orifice 22 creates a pressure differential between outlet port 13 and chamber 31 such that the pressurized fluid acting against an annular surface 34 on the valve element 14 moves the valve element to the second position against the force of the spring 19. This permits controlled reverse flow from the outlet port 13 to the inlet port 12. When the fluid pressure decreases below a preselected pressure level, the spring 33 moves the valve spool 26 to the first position blocking fluid flow through the vent passage 24. With vent passage 24 blocked, the fluid pressure in chamber 17 and the outlet port 13 equalizes allowing the spring 19 to move the valve element 14 to the first position.

Although the components of the above-described embodiment are positioned within a single body, alternatively valve spool 26, bore 28, chamber 31, passage 32 and spring 33 can be contained within a separate body and connected to the associated components in body 11 through separate conduits, not shown.

Referring now to FIG. 2, the above-described pressure responsive check valve 10 is shown as an integral component of a hydraulic steering system 36 for an articulated vehicle, not shown. In such hydraulic steering system, the pressure responsive check valve 10 is positioned between a pair of pumps 37, 38 and a control valve 39 which in turn is connected to a pair of steering cylinders 41, 42 through respective lines 43, 44.

The pumps 37, 38 have a common output line 46 connected to the inlet port 12 while a line 47 connects the outlet port 13 with the control valve 39. Another pump 48 is connected to the line 47 through a check valve 49. The pressure responsive check valve 10 and the check valve 49 blocks undesirable cross flow between these pumps. A relief valve 50 is connected to the output line 46 for relieving excessive pressure in pumps 37, 38 and the output line 46. A relief valve 50 is similarly associated with pump 48.

With the control valve 39 in its centered position shown, line 47 is in communication with lines 43, 44 through passages 56, 57 having respective restrictors 58, 59 therein. The lines 43, 44 are also in communication with a drain line 60 through passages 61, 62 having respective restrictors 63, 64 therein.

In operation, assuming that the control valve 39 is in the position shown, upon a front wheel of the vehicle hitting an object so as to provide a sudden relatively high pressure build-up in either of the lines 43, 44, for example line 43, some of the fluid pressure will be relieved through the passage 61, restrictor 63, line 60 and to a tank 65. However, some of the fluid pressure in line 43 will be transmitted through passage 56 and restrictor 58 into the output line 47 and into the outlet port 13 and through the passage 32 into chamber 29. Also on some vehicles, the valve 39 can be shifted when the front wheel hits the object, either by a follow-up system reacting to counteract a steering motion caused by the wheel striking the object, or by the operator reacting to the situation and manually shifting the valve. In either case, shifting of the valve opens a much larger passage through the valve 39 to connect line 43 with line 47. Regardless of which flow path the fluid takes through the valve 39, however, with the valve element 14 in the first or closed position, the fluid pressure in the line 47 and hence chamber 29 will increase rapidly. Should the fluid pressure exceed the preselected pressure level, the valve spool 26 will be moved to its second position venting chamber 17 to the tank 65. The pressurized fluid acting on the annular surface 34 will move the valve element 14 rightwardly to its second position whereupon fluid pressure is transmitted into line 43 and past the relief valve 48. When the fluid pressure subsides to a level below the preselected pressure level, valve spool 26 and valve element 14 will be returned to their first position.

Thus, from the above, it will be seen that the pressure responsive check valve 10 permits normal operation of the hydraulic steering system 36 when the fluid pressure in the outlet port 13 is below the preselected pressure level. However, when the fluid pressure exceeds the preselected pressure level, the valve element 14 is moved to the second position so that the high pressures are relieved through the relief valve 50.

Other aspects, objects and advantages of this invention can be obtained from a study of the drawings, the disclosure and the appended claims.

The embodiments of the invention in which an exclusive property or privilege is claimed are defined as follows:

1. A pressure responsive check valve comprising:
   a body having an inlet port and an outlet port;
   a valve element positioned within said body and being movable between a first position at which the inlet port is blocked from communication with the outlet port and a second position at which the inlet port is in communication with the outlet port, said element being movable to said second position in response to the fluid pressure in the inlet port being greater than the fluid pressure in the outlet port;
   a first chamber at one end of said valve element;
   an orifice connecting the outlet port with said first chamber;
   a vent passage connected to said first chamber;
   a spool positioned in said vent passage and being movable between a first position at which flow through the vent passage is blocked and a second position at which the first chamber is vented;
   a second chamber at one end of the spool; and
   a passage connecting the second chamber with the outlet port independently of said orifice.

2. The check valve of claim 1 including a spring positioned in said first chamber in the pathway of the element for urging the element to the first position and a spring positioned in the pathway of the spool for urging the spool to the first position.

3. A hydraulic system comprising:
   a fluid motor;
   a fluid pump;
   a pressure responsive check valve having an inlet port connected to said fluid pump, an outlet port connected to said fluid motor, a valve element movable between a first position at which fluid flow through the check valve is blocked and a second position at which fluid can pass through the check valve between said inlet and outlet ports, said element being movable to the second position in response to the fluid pressure in the inlet port being greater than the fluid pressure in the outlet port, a first chamber at one end of the valve element, an orifice connecting the outlet port with the first chamber, a vent passage connected to the first chamber, a spool positioned in said vent passage and being movable between a first position at which flow through the vent passage is blocked and a second position at which the first chamber is vented, a second chamber at one end of the spool, and a passage connecting the second chamber with the outlet port independently of said orifice.

4. The hydraulic system of claim 3 including a relief valve connected to the inlet port for relieving excessive pressure in the system.

* * * * *